:::
United States Patent [19]
Jones

[11] Patent Number: 5,437,889
[45] Date of Patent: Aug. 1, 1995

[54] FLUIDIZED BED WITH SPRAY NOZZLE SHIELDING

[75] Inventor: David M. Jones, Ramsey, N.J.

[73] Assignee: Glatt Air Techniques, Inc., Ramsey, N.J.

[21] Appl. No.: 103,129

[22] Filed: Aug. 9, 1993

Related U.S. Application Data

[62] Division of Ser. No. 783,124, Oct. 28, 1991, Pat. No. 5,236,503.

[51] Int. Cl.$^6$ .............................. B05D 1/24
[52] U.S. Cl. .................... 427/185; 427/213
[58] Field of Search ................. 427/185, 213

[56] References Cited

U.S. PATENT DOCUMENTS

| | | | |
|---|---|---|---|
| 3,110,626 | 11/1968 | Larson et al. | 118/303 |
| 3,196,827 | 7/1965 | Wurster et al. | 118/24 |
| 4,335,676 | 6/1982 | Debayeux et al. | 118/303 |
| 4,701,353 | 10/1987 | Mutsers et al. | 427/213 |
| 4,858,552 | 8/1989 | Glatt | 118/19 |
| 4,960,244 | 10/1990 | Maag et al. | 239/424 |

FOREIGN PATENT DOCUMENTS 3323418  1/1985  Germany .

OTHER PUBLICATIONS

Swarbrick & Boylan, Encyclopedia of Pharmaceutical Technology, 1988, pp. 192–195 (no month).

*Primary Examiner*—Janyce Bell
*Attorney, Agent, or Firm*—Jacobson, Price, Holman & Stern

[57] ABSTRACT

A shield, such as an upstanding cylindrical partition, is mounted adjacent to an air source, such as an air distribution plate/screen of a Wurster system processor, whereby the open upper end of the partition is generally horizontally registered with and disposed about the upper extremity of an associated spray nozzle. The open lower end of the inner cylindrical partition is generally sealed relative to the air distribution plate/screen and operative to receive air upwardly therethrough for subsequent passing through the inner partition about the spray nozzle. The upper end of the inner tubular partition shields the initial spray pattern discharged from the spray nozzle and prevents the premature entrance of particles moving into the spray nozzle area.

9 Claims, 1 Drawing Sheet

FLUIDIZED BED WITH SPRAY NOZZLE SHIELDING

This is a Divisional of application Ser. No. 07/783,124, filed Oct. 28, 1991 now U.S. Pat. No. 5,236,503, dated Aug. 17, 1993.

BACKGROUND OF THE INVENTION

1. Field of the Invention

This invention relates to a fluidized bed system having a spray nozzle therewithin. One such system is a Wurster system type of fluidized bed processor including an outer cylindrical partition disposed within the product container and a spray nozzle within the partition. The spray nozzle itself is shielded, preferably by being surrounded by a cylindrical partition extending from the orifice plate or screen at the bottom end of the product container to shield the spray nozzle tip.

2. Description of Related Art

Various different forms of spray coaters heretofore have been provided including the Wurster system type. These previously known devices may experience turbulent air flow immediately above the spray nozzle. Particles to be coated within the system may enter the liquid discharge spray pattern before the spray pattern has fully developed. This results in uncontrolled droplet formation upon those particles that enter the spray pattern too soon and effects the effectiveness of the system resulting in excessive agglomeration and relatively extensive processing time.

U.S. Pat. No. 3,110,626 to G. L. Larson et al. discloses an apparatus whereby coating discrete solids suspended in a moving air stream is carried out within the interior region of a velocity concentration control element mounted in the base region of a funnel-shaped coating chamber. However, such apparatus does not include any means for shielding the base of the spray pattern with an upwardly flowing column of air in order that the spray pattern may substantially develop before entrance thereinto of discrete solids to be coated.

U.S. Pat. No. 4,335,676 to Christian Debayeux et al. discloses a spouted bed granulating and/or coating apparatus wherein flow directing structure is provided to direct the gaseous flow stream in the upward direction for preventing contact and agglomeration of particles in the vicinity of the walls of the device. This patent fails to disclose structure by which the lower portion of the spray pattern is protected by an upwardly flowing column of air in order that the spray pattern may more fully develop before the entrance thereinto of particles to be coated.

U.S. Pat. No. 4,701,353 to Stanislaus M. P. Mutsers et al. discloses an apparatus whereby the liquid spray material is discharged out of a central channel as a vertically closed, conical film with a thrust exceeding the thrust of the gas stream for the purpose of causing the conical film to be nebulized to very fine droplets with the aid of the surrounding gas stream. The resultant spray pattern is not protected about its initial base end by an upwardly moving column of air disposed thereabout.

U.S. Pat. No. 4,960,224 to Gustav A. Magg et al. discloses an atomizing nozzle constructed in a manner to eliminate the need to provide a metering pump or flow meter for each atomizing nozzle of an associated fluidized coating bed with the control of the flow through each atomizing nozzle being accomplished by varying the internal bore size of the flow control tubes. However, this patent fails to disclose structure for shielding the resultant spray pattern from immediate entrance thereinto of particles to be coated before the spray pattern is reasonably developed.

U.S. Pat. No. 4,858,552 to Werner Glatt et al. discloses an apparatus whereby a fluidized current carries particles, while still plastic, upwardly through a channeling device for agglomerated material disposed at a distance above the perforated base causing the particles to impinge on the underside of a rotatable means providing for shaping the agglomerated material. The Glatt et al. apparatus does not disclose structure by which the particles to be coated are shielded against entry into the initially forming spray pattern.

U.S. Pat. No. 3,196,827 to D. E. Wurster et al. discloses a tubular partition defining an upbed therein into which an air and spray discharge pattern is directed and wherein a downbed of particles in near weightless suspension is disposed outwardly of the tubular partition, the spray nozzle being disposed below the bottom of the partition and above the associated air distribution plate or screen. With this device, particles being coated are also free to immediately enter the lower beginning portion of the spray pattern.

SUMMARY OF THE INVENTION

It is understood that the dynamics of the area around the nozzle and spray cloud (often described as the coating zone) determine the overall coating speed as well as the amount of agglomeration during a fluidized bed coating process. The type of nozzles commonly used are pneumatically atomized, i.e. using a high-speed jet of air in order to break a liquid jet into small droplets and to distribute the small droplets in a cone-shaped cloud or spray pattern.

It has been observed in the course of several laboratory Wurster coating trials that material, including substrate, from the fluidization or processing air stream has been drawn into the spray nozzle liquid/air jet before the spray pattern has been fully developed. In some cases, when the material being coated has abrasive properties, it was found that the material was moving with sufficient force to cause erosion of the nozzle tip.

Accordingly, the present invention introduces a shielding or barrier means around the lower portion of the nozzle, within the upbed, for shielding the nozzle and allowing up flow of air within the shielding means around the nozzle. This ensures that particles, disposed in the product container outwardly of the barrier, are prevented from entering the spray pattern before the spray pattern is sufficiently developed. This allows the droplet density to decrease before contact therewith by the particles of the fluidized bed and, accordingly, the particle surface will be more evenly wetted preventing excessing particle agglomeration. The liquid contact with the particles can be more precisely controlled and higher spray rates can be achieved with less agglomeration.

A principal object of this invention is to shield the spray discharging nozzle of a Wurster type fluidized bed processor. The shield prevents the entry of particles into the spray pattern before the spray pattern has had an opportunity to develop.

Another object of this invention is to provide an apparatus by which particles to be coated are prevented from entering the spray pattern until such time as the droplet density of the spray pattern has been substantially reduced.

Yet another object of this invention is to provide a columnar shield of upwardly moving air about the lower portion of the spray pattern formed by a spray nozzle of a Wurster system processor and wherein the shield may be adjusted vertically according to the spray pattern being discharged and the air flow velocity of the processing air.

A further object of this invention is to provide a shield such as that set forth in the immediately preceding object and whereby the vertical positioning of the shield may be utilized to alter the associated spray pattern.

Yet another object of this invention is to provide a coating zone within the upbed of a Wurster system coater whereby the coating zone is protected by a surrounding column of upwardly moving air in order to allow the coating zone to more fully develop and the liquid droplet density thereof to be substantially reduced prior to entry of particles into the coating zone.

These, together with other objects and advantages which will become subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENT

Figure 1:
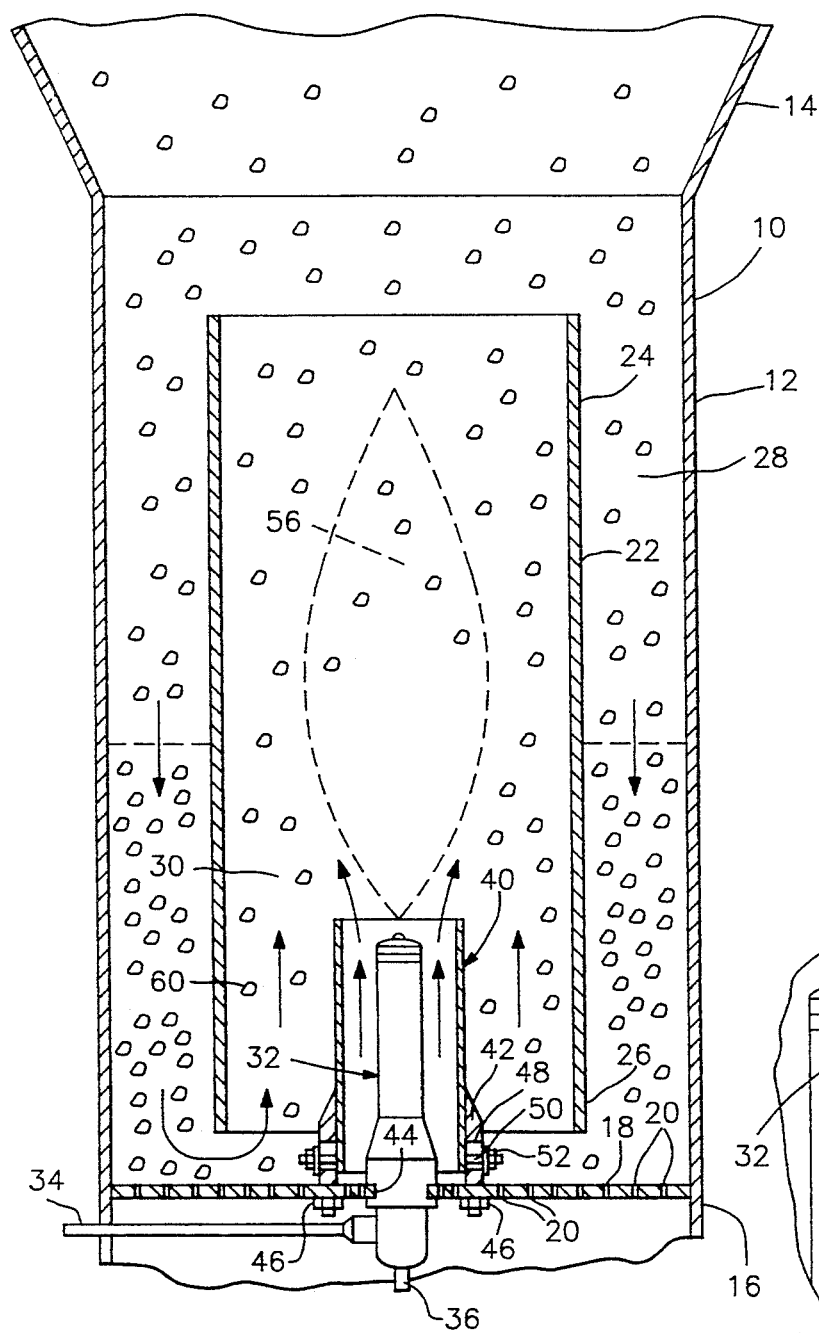
FIG. 1 is a fragmentary schematic vertical sectional view of a Wurster-type bottom spray coater illustrating the mounting of an inner tubular partition about the spray nozzle and projecting at least slightly above the upper extremity of the spray nozzle.
Figure 2:
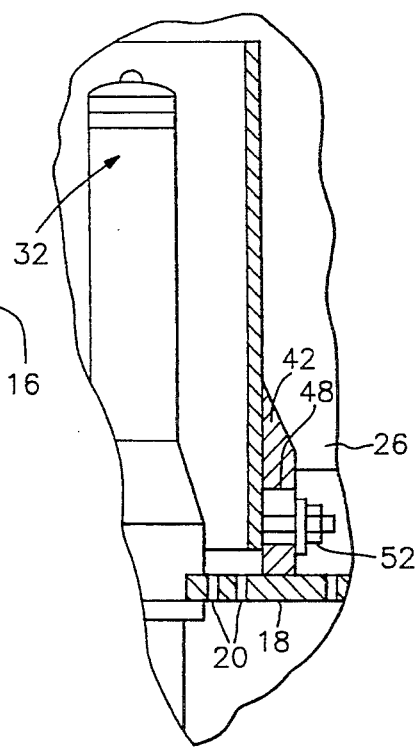
FIG. 2 is an enlarged fragmentary schematic vertical sectional view illustrating the manner in which the interior partition may be adjusted vertically relative to the air distribution plate.

Referring now more specifically to the drawings the numeral 10 generally designates a typical Wurster system type of coater, modified in accordance with the present invention. The coater includes a product container section 12, an expansion chamber 14 into which the upper end of the product container section 12 opens, and a lower plenum 16 disposed beneath the product container, separated therefrom through the utilization of an air distribution plate or screen 18. The upper end of the expansion chamber 14 may open into a filter housing (not shown) disposed thereabove including the necessary air filter structure and air outlet. A typical Wurster coater is described in *Encyclopedia of Pharmaceutical Technology*, Vol. 1. pp. 192–195 (1988).

The air distribution plate or screen 18 defines a plurality of air passage openings 20 through which air or gas from the lower plenum 16 may pass into the product container section 12. As is conventional in Wurster-type fluidized bed systems, the holes in the plate 18 in the area outside the cylindrical partition 22 are smaller in diameter than the holes beneath the partition 22. This results in higher air volumes and velocities in the central area than in the downbed area. Although only a single plate 18 is depicted, it should be understood that the plate 18 is typically formed of two plates, an outer annular plate and an inner replaceable plate whereby the air flow ratios between the upbed and the downbed may be changed by substituting the inner plate with a plate having different air opening configurations. Further, the inner plate may itself be formed of two stacked plates having identical air opening configurations but which are rotatable with respect to each other to change the effective open area.

The product container 12 has a cylindrical partition 22 supported therein in any convenient manner having open upper and lower ends, 24 and 26, the lower end 26 being spaced above the air distribution plate or screen 18. The partition 22 divides the interior of the product container section 12 into an outer annular downbed area 28 and interior upbed 30. A spray nozzle assembly, referred to generally by the reference number 32, is mounted at or through the air distribution plate 18 and preferably projects upwardly into the interior of the cylindrical partition 22 and the upbed 30 defined therein. The spray nozzle 32 receives a supply of air under pressure through an air supply line 34 and coating liquid under pressure through a liquid supply line 36, as is known in the art.

This invention incorporates the provision of a shield, such as an inner cylindrical partition 40 disposed about the upwardly projecting spray nozzle assembly 32. The inner cylindrical partition 40 has its lower open end snugly and telescopingly received within a tubular collar 42 secured to the air distribution plate or screen 18 about the opening 44 through which the spray nozzle assembly 32 is secured. The tubular collar 42 is secured to the air distribution plate or screen 18 through the utilization of suitable fasteners 46. The collar 42 includes circumferentially spaced axial slots 48 in which mounting studs 50 projecting radially outwardly of the inner cylindrical partition 40 are slidingly received. The mounting studs 50 have threaded bolts 52 threadedly engaged therewith whereby vertically adjustment of the inner cylindrical partition 42 relative to the tubular collar 42 may be enabled.

The spray nozzle assembly 32 discharges a spray pattern 56 of air and coating liquid. Some of the air introduced into the lower plenum 16 passes upwardly through the openings 20 formed through the air distribution plate or screen 18 below the inner cylindrical partition 40. The partition 40, as well as the tubular column of upwardly rising air about the spray nozzle assembly 32, shields the lower, beginning portion, of the spray pattern 56. The particles 60, passing upwardly through the upbed 30, are not drawn into this spray pattern. The annular column of air thereby allows spray pattern 56 to substantially develop, and the liquid droplet density of the spray pattern is substantially reduced before particles 60 enter into the spray pattern 56. By adjusting the height of the inner cylindrical partition 40 relative to the tubular collar 42, the height of the upper end of the inner cylindrical partition 40 relative to the upper extremity of the spray nozzle assembly 32 may be adjusted.

Although only a single outer partition 22, inner partition 40, and spray nozzle 32 are depicted, multiple outer partitions may be employed, each having one or more spray nozzles and inner partitions associated therewith.

Various modifications to the above-described preferred embodiment may be utilized. For example, a spray nozzle may be utilized in systems other than Wurster coater type systems where shielding is desirable. Such systems may not require the spray nozzle to be upwardly disposed; the spray nozzle may be angled with respect to the major axis of the container. The shielded spray nozzle may also be utilized without a Wurster-type cylindrical partition 22. The shielded spray nozzle may also be within an expansion chamber instead of the product container. Further, although an air distribution plate or screen is depicted, gas flow may originate into the processor through other structural arrangements. In addition, although the shielding of the spray nozzle is preferably provided by an inner cylindrical partition 40, other shielding arrangements may be utilized. For example, shielding of the spray nozzle may be accomplished by formation of an air wall or stream that surrounds the nozzle and prevents particles from prematurely entering into the spray pattern. Alternatively, a deflector or shield may be formed integral with the spray nozzle itself to prevent particles from interfering with the developing spray pattern.

Utilizing the concepts of the invention hereinabove described, the following represents test procedures followed and results obtained made in accordance with the invention:

Materials

Sugar/cornstarch beads (Nu-pariels, Crompton & Knowles, Ingredient Technology Division, Pennsauken, N.J.) in the size range of 20–25 mesh were used as a model coating substrate for most of the trials. These beads are deemed to be a good model since many active materials are converted into pellet form for coating, or are layered onto these type of beads. Theophylline (<325 mesh, Knoll Whippany, N.J.) and potassium chloride (20–60 mesh, Mallinkrodt, St. Louis, Mo.) served as models for powder substrates.

A typical aqueous HPMC based coating solution (Opadry, Colorcon West Point, Pa. 10% coating by weight in tap water) was used throughout the trials. A green colored formula (YS1-3303N) was used for most of the experiments but was shifted to a Maroon color (Y-1-3910) to check the effects of viscosity and composition differences on the coating performance.

Equipment

All of the coating trials were carried out in a GPCG60/100 fluid bed granulator/coater (Glatt Air Techniques, Ramsey, N.J.) using either the 32" or 18" Wurster process inserts. The 18" Wurster trials utilized the standard 9" diameter partition insert, which is 22" long. The 32" Wurster trials were performed with a single partition insert 12" in diameter, 27.5" long.

The partition height was adjusted so that a thick stream of substrate flowed through the coating zone. Due to the different airflow patterns in the two sizes of Wurster inserts used the partition needed to be set at a different height for each insert. A distance of 0.75 inches from the bottom plate was sufficient for the 18" Wurster. For the 32" Wurster the partition was raised to 1.25 inches above the bottom plate to maintain a high density particle stream.

A bottom screen, stainless steel dutch weave type, 100 mesh rating was in place over the air distribution plate during all the trials. Exhaust filters, "PACF" type, rated 3–10 microns were used to retain any process fines. The filter shake cycle was set to shake for 3 s every 30 seconds in the GPCG mode. This meant that each filter shook 3 s after every 63 s of process time.

Two types of nozzles were used each with a different characteristic spray pattern development. Model #940/7-1-S25 (manufactured by Gustav Schlick Co. Coburg, Germany referred to as S-25) is supplied standard for these sizes of Wurster inserts. Model #0/4-7-1S48 (referred to as S-48) has a higher air consumption rate and fully atomizes the liquid stream distributing the droplets in a cone shaped pattern (develops spray pattern) in a shorter distance. Liquid was delivered to the nozzles with a peristaltic pump. The atomization air pressure was adjusted so that the droplet size distribution would remain the same no matter which nozzle was in use. Nozzle ports with a 1.2 mm opening were used with the air cap adjusted flush with the nozzle port end.

In those trials where the fluid flow in the coating zone was altered the fluidized particles were delayed from contacting the atomized stream by a 3" diameter cylinder partition mounted on the bottom plate and extending up 0.5" above the nozzle port height. The cylinder partition was open to the fluidizing air at the bottom.

Test Procedure

The air volume settings were determined by a pre-trial fluidization test. Air volume was then held constant for each unit throughout the trials without further optimization. For the 18" Wurster the air volume was 750 cfm (±100 cfm) and 1700 cfm (±100 cfm) was used on the 32" Wurster. For experiments on both inserts the product temperature was held between 38° and 42° C. with an inlet air dewpoint of 8° C. (±1° C.).

Each run would be allowed to come to the desired test conditions, then the spray was started at a slow rate. If after 15 minutes of spray a sample taken had less than 1% retained on the sieve specified for the test then the performance was deemed acceptable and the spray rate would be raised. The amount of the spray increase was determined by estimating the point at which 1% of the sample would be retained on the test sieve.

With the sugar beads a 20 mesh sieve was the test sieve as mentioned above. After each trial the batch was put through a 20 mesh sieve in order to remove any agglomerates. The beads passing through 20 mesh were used in the subsequent trial. For the 32" trials with sugar beads an 18 mesh sieve was used in the test in order to account for the bead growth due to repeated coating. On the 18" Wurster a starting charge of 45 kg was used compared to 200 kg on the 32" Wurster.

The experiment with theophylline as a substrate used 26 kg of raw material in the 18" Wurster. The test sieve for Theophylline was 100 mesh. With potassium chloride 50 kg were charged to the product container. At the end of the potassium chloride run the process parameters were varied in order to find the maximum possible spray rate without having more than 1% on 18 mesh. Air volume was increased from the protocol value of 750 cfm to the highest value possible, 1200 cfm. Atomization air pressure was also increased from 2.5 bar to 4.0 bar.

Experimental Program

A matrix of experiments was set up to test the coating performance with nozzle type, barrier installation, and machine size as variables. On the 18" Wurster four experiments were run with the sugar beads and the green coating: nozzle S-25 with and without the barrier in place, and nozzle S-48 with and without the barrier in place. The set of experiments using the S-25 nozzle was then repeated in order to confirm the results. Powdered substrate, theophylline and potassium chloride were used with the S-48 nozzle and the barrier in place in the last two experiments on the 18" Wurster.

In the 32" Wurster two experiments using the S-48 nozzle and spraying onto sugar beads were performed—one with the barrier in place and one without. In these trials the coating solution was switched to maroon to see if the improvements in coating efficiency were still evident with a more viscous solution.

Results and Discussion

The spray rate at 1% agglomeration was estimated from the data reported during the run on the batch sheets. Data for the matrix of 18" Wurster experiments is shown in Table 1. The data for the S-48 nozzle experiments has been averaged between the two runs.

TABLE 1

18" Wurster
Spray Rate @ 1% Agglomeration
(ml/min)

| nozzle | barrier | no barrier |
| --- | --- | --- |
| S-25 | 290 | 90 |
| S-48 | 410 | 270 |

Examination of the table reveals a dramatic improvement in spray rate at an equal level of agglomeration for use of a barrier as compared with the standard case without use of a barrier. It is also of interest that the improved efficiency by changing to a nozzle that develops the spray pattern more quickly is nearly the same as placing a barrier around the standard nozzle. This observation is in agreement with the hypothesis that the agglomeration and limitation of spray rate is caused by the premature contact of substrate with the developing spray pattern.

With a similar extraction of the data the 32" Wurster showed 1% agglomeration at 550 g/min spray without the barrier and 780 g/min with the barrier in place. Only the S48 nozzle was tested this time with the maroon coating. The efficiency increase is in similar proportions to the experiment on the 18" Wurster even though the scale of the machine and the coating characteristics were changed.

Both the theophylline and potassium chloride coated with the S-48 nozzle and the barrier in place had similar behavior during the run to a conventional machine setup. The spray rate for the potassium chloride substrate was 1050 g/min at the point of first agglomeration. Agglomeration began to occur slowly at 1250 g/m. However, at this high spray rate, the machine's drying capacity was exceeded and the desired product temperature could not be maintained. As a result, excessive surface moisture probably allowed the formulation of liquid bridges between particles ultimately leading to agglomeration. Although the acceptable spray rate for theophylline was less dramatic, the 230 g/min sprayed was higher than expected and yet did not exceed an acceptable level as in the sugar bead experiments.

The surprising result of these experiments was the ability to coat the small particle size material without granulating the substrate. Comparative SEM's at the same magnification show the small fraction of the particle size distribution being incorporated into the coating on the large fraction of the distribution but then the material ceases to agglomerate and at 10% coating the particle size is very similar to the 4% sample. The average size of the end coated particles being significantly less than 100 microns, the current accepted lower limit for discrete fine particle coating. It was postulated from this observation that the minimum particle size for discrete coating might be effected by the substrate/spray pattern contact and could be significantly reduced by limiting that contact while the spray pattern is still developing.

CONCLUSIONS

Throughout the experiments described here it is clear that limiting the contact of substrate with a developing spray pattern so that the particle surface is only exposed to spray in low droplet density areas of the spray pattern reduces the over wetting of substrate surface thereby reducing the rate of product agglomeration. Introduction of a barrier to prevent solids from entering the spray pattern and changing the nozzle design so that the pattern develops in a smaller space were shown to have a roughly equivalent effect. Substantial efficiency improvements were still evident when the barrier was used with the modified nozzle. This technique of improved solid liquid contacting was observed on two different sizes of equipment with two different coating formulations on three different substrates.

In addition to the expected result of improved coating efficiency it was also observed for the theophylline, the sample with smallest particle size, that the particle size of the coated material could be kept below normally accepted minimum sizes.

What is claimed is:

1. A method for coating product in a fluidized bed having a product container section opening upwardly into an expansion chamber and downwardly into a lower plenum chamber through a generally horizontally disposed air distribution plate/screen having openings formed therethrough for upward air flow from said lower plenum chamber into said product container section, said product container section including a substantially cylindrical partition spaced above said air distribution plate/screen for dividing said product container section into an inner upbed area and an outer downbed area, and an upwardly discharging spray nozzle mounted substantially centrally within said cylindrical partition, said method including the steps of positioning a cylindrical inner partition adjacent said distribution plate/screen and extending upwardly therefrom, surrounding said nozzle, and projecting upwardly to a level at least equal in height to said nozzle, and passing air upwardly through said air distribution plate/screen and through said cylindrical inner partition about said nozzle to shield the initial spray pattern developed by said nozzle against the entrance of particles moving upwardly through said upbed.

2. The method of reducing the processing time of a granulator/coater of the fluidized bed type including a product container section opening upwardly into an upper expansion chamber and downwardly into a lower plenum chamber through a generally horizontal air distribution plate/screen having openings formed therethrough for upward air flow from said lower plenum chamber into said product container section and wherein said product container section contains an upright cylindrical partition supported centrally therein spaced above said air distribution plate/screen and dividing said product container section into an inner upbed and an outer downbed, and an upwardly discharging spray nozzle mounted centrally with respect to said upbed in a lower portion thereof, said method including the steps of forming a radially confined and shielded column of air to flow upwardly about said nozzle from said air distribution plate/screen and to be freely discharged into said upbed at an elevation generally vertically registered with the upper extremity of said nozzle.

3. The method of claim 1 wherein the shielding step comprises providing a barrier by positioning a partition about the spray nozzle, said partition having opposite open ends, one open end of said partition positioned away from the spray nozzle tip toward the direction of the discharging spray, the other open end of said partition positioned to surround a portion of the spray nozzle.

4. A method for shielding an initial spray pattern developed by a discharging spray nozzle situated within a fluidized bed processor, said fluidized bed processor including a container for containing particles to be processed, a fluidizing gas source, and a discharging spray nozzle having a spray nozzle tip within the container, the method comprising the steps of forming a fluidized bed within the container by passing fluidizing gas through the particles to be processed, discharging a spray from the discharging spray nozzle into the fluidized bed, and shielding the initial spray pattern developed by the discharging spray nozzle by providing a barrier surrounding the spray nozzle tip and oriented substantially parallel to the spray nozzle for preventing the particles to be processed from entering the initial spray pattern.

5. The method of claim 1, wherein the shielding step comprises providing a barrier formed from a column of gas about the discharging spray nozzle tip and directed substantially parallel with the spray nozzle, said column of gas extending beyond the spray nozzle tip in the direction of the discharging spray.

6. The method of claim 5, wherein the column of gas is formed from the fluidizing gas.

7. The method of claim 5, wherein the column of gas is substantially radially confined.

8. The method of claim 7, wherein the forming of the substantially radially confined column of gas comprises positioning a cylindrical partition having opposite open ends around the spray nozzle, passing gas through one end of the cylindrical partition and outward through the other end of the cylindrical partition, said other end positioned adjacent the spray nozzle tip, whereby the column of gas prevents the particles being processed from entering the initial spray pattern.

9. The method of claim 8, wherein the column of gas is formed from the fluidizing gas.

* * * * *

UNITED STATES PATENT AND TRADEMARK OFFICE
CERTIFICATE OF CORRECTION

PATENT NO. : 5,437,889 Page 1 of 1
APPLICATION NO. : 08/103129
DATED : August 1, 1995
INVENTOR(S) : David M. Jones It is certified that error appears in the above-identified patent and that said Letters Patent is hereby corrected as shown below:

Column 10, line 3, "method of claim 1" should read -- method of claim 4 --.

Signed and Sealed this

Twenty-fifth Day of December, 2007

JON W. DUDAS
*Director of the United States Patent and Trademark Office*